Patented Apr. 6, 1954

2,674,577

UNITED STATES PATENT OFFICE 2,674,577

AIRPLANE ENGINE OIL CONTAINING COMBINATION OF MAGNESIUM AND ZINC SALTS OF ALKYL HYDROXY AROMATIC COMPOUNDS

Frederic C. McCoy, Beacon, Bill L. Benge, Salt Point, Edwin C. Knowles, Poughkeepsie, and Charles C. Towne, Beacon, N. Y., assignors to The Texas Company, New York, N. Y., a corporation of Delaware No Drawing. Application May 7, 1952,
Serial No. 286,634

15 Claims. (Cl. 252—42.7)

This invention relates to an improved lubricating oil for the crank case of an internal combustion engine, and more particularly to an airplane engine oil of this type.

This is a continuation-in-part of our copending application Serial No. 143,836 filed February 11, 1950, now abandoned.

The more recent demands for aircraft with greater payload, higher cruising speed and increased maneuverability have caused the aeronautical engineer to incorporate in airplane engines every small increment of power increase of which the engines are capable. This greater output plus increased operational and maintenance severity have extended the crank case lubrication requirements of an aircraft engine almost beyond the ability of the best straight (non-additive) mineral lubricating oils. The use of various additives in mineral lubricating oils, particularly in motor and diesel oils, to meet so-called heavy duty service conditions, has become common practice. However, the problem in airplane crank case lubrication is more complex, since it is essential that the lubricant employed be not responsible for premature failure or power loss of the engine in flight. For this reason, the use of the conventional motor or diesel oil additives in airplane engine oils has been discouraged as imparting additional variables to the performance of the engine, where a highly refined straight mineral lubricating oil will suffice.

The use of various metal base organic type additives has been found effective in motor and diesel engine service to reduce ring sticking, minimize lacquer formation and carbon deposition, improve the oxidation stability of the straight mineral lubricating oil and afford protection against bearing corrosion. An additive of this type which has heretofore been suggested is a metallic alkyyl phenolate, wherein the alkyl group substituent on the benzene nucleus is of comparatively high molecular weight to increase the solubility of the additive in the mineral lubricating oil. As an example of an additive of this type, there may be mentioned tin diamyl phenolate which, when employed in conjunction with another detergent, such as a barium sulfonate, has been found to result in exceptionally clean engines operated under high temperature conditions in heavy duty service. Thus, this combination of additives serves to substantially prevent lacquer deposition on the piston skirt and cylinder wall, materially reduce the deposition of carbon in the ring grooves with avoidance of ring sticking, and generally improve the oxidation stability of the mineral lubricating oil.

However, when an additive lubricating oil of this type is employed for the crank case lubrication of an aircraft engine operated at the higher power levels on a high octane airplane fuel containing 3 cc. or more of tetraethyl lead per gallon, it is found that this additive lubricating oil objectionally increases or modifies the combustion chamber deposits to such an extent as to result in spark-plug fouling, preignition and premature loss of power of the engine. It has been found that the metal content of the additives in the lubricating oil adds to the content of the combustion chamber deposits which normally result from the use of the leaded fuel; and this addition builds up the deposits in such a manner as to give stalagmite and stalactite formations on the piston top and cylinder head, causing preignition and spark-plug fouling. Consequently, while this additive type of oil is highly desirable from the standpoint of engine cleanliness in the prevention of lacquer and carbon deposition, the serious nature of the combustion chamber deposits resulting therefrom prevents its successful use in high power airplane engine crank case lubrication.

One of the principal objects of the present invention is to provide an improved crank case lubricant for an internal combustion engine which is capable of use under high-power, high-temperature engine operating conditions with highly leaded fuels, and which not only provides superior engine cleanliness over that obtained with the straight mineral lubricating oil but also avoids the formation of the objectionable type of combustion chamber deposits.

A further object of the invention is to provide a superior type of airplane engine oil capable of safe and excellent lubrication under high power conditions for periods at least as long as the normal engine overhaul periods.

Other objects and advantages of the invention will be apparent from the following description taken in conjunction with the appended claims:

In accordance with the present invention, it has been found that the above listed objects are attained by incorporating in a highly refined mineral lubricating oil a combination of magnesium and zinc salts of nuclearly alkylated hydroxy aromatic compounds have the hydroxy group attached to the ring. The preferred type of nuclearly alkylated hydroxy aromatic compound is an alkyl phenol, prepared by alkylating phenol, cresol, xylenol or other alkyl phenol, with an olefin polymer to obtain an alkylated phenol wherein the alkyl substituents on the benzene nucleus contain a total of at least 15 carbon atoms, and preferably at least 18 carbon atoms. In the case of a mono-alkylated phenol, the olefin polymer employed is a $C_{15}$ to $C_{30}$ polymer, or any fraction thereof, so that the alkyl substituent on the benzene nucleus contains 15 to 30 carbon atoms. However, the phenol may be polyalkylated with a $C_8$ or higher olefin polymer fraction, such as dialkylated with a $C_9$ propylene polymer, whereby the alkyl substituents on the benzene nucleus contain a total of at least 16 carbon atoms and up to 60 carbon atoms or more.

In place of the nuclearly alkylated hydroxy mononuclear aromatic hydrocarbons mentioned above, similar nuclearly alkylated hydroxy polynuclear aromatic hydrocarbons having the hydroxyl group attached to the condensed ring can be employed, such as alkylated naphthols, wherein the alkyl substituents on the naphthalene or other polynuclear aromatic nucleus have a total of at least 15 carbon atoms. All of the foregoing nuclearly alkylated hydroxy aromatic hydrocarbon compounds consist of carbon, hydrogen and oxygen, with one benzene or condensed ring nucleus having a single hydroxyl group attached to the ring; and when the divalent magnesium and zinc salts of these compounds are formed, the metal replaces the hydrogen atoms of two hydroxyl groups, each attached to a different nucleus, so that the resulting salt contains two alkyl phenolate or naphtholate, etc. nuclei interconnected by the metal.

In addition to the simple magnesium or zinc alkyl phenolates, naphtholates, etc. discussed above, the respective nuclei can also be interconnected by hydrocarbon groups in addition to the metal. For example, two mols of alkyl phenol can be condensed with one mol of formaldehyde or other aldehyde to form a compound wherein two alkyl phenol nuclei are interconnected by a methylene group when formaldehyde is employed, or other alkylene group when a higher aldehyde is employed; and the resulting compound, when neutralized to form the divalent magnesium or zinc salt, replaces the two hydrogens of the two hydroxyl groups, each attached to a different benzene nucleus, so that the two phenolate nuclei are then interconnected by both the metal and the hydrocarbon group. These latter aldehyde condensation products bear a close relationship to the simple alkylated phenols or naphthols first discussed, since their predominating group characteristic is the alkyl phenolate or alkyl naphtholate nucleus. The magnesium and zinc salts of all of the foregoing types of compounds have been found effective for purposes of the present invention, which thus involves the discovery of the unexpected effect and new result of the combination of magnesium and zinc salts of the nuclearly alkylated hydroxy aromatic hydrocarbon compounds consisting of carbon, hydrogen and oxygen, wherein each nucleus has a single hydroxyl group attached to the ring, and wherein each nuclearly alkylated hydroxy aromatic hydrocarbon nucleus contains alkyl substituents having a total of at least 15 carbon atoms and up to 60 carbon atoms or more.

For convenience in description, the magnesium and zinc alkyl phenolates will be discussed by way of example in the following text; but it is to be understood that this text also applies to the similar magnesium and zinc salts of alkyl naphthols or other nuclearly alkylated hydroxy polynuclear aromatic hydrocarbon compounds, as well as to the similar magnesium and zinc salts of the alkyl phenol-formaldehyde or other nuclearly alkylated hydroxy aromatic hydrocarbon-aldehyde condensation products set forth above.

The magnesium alkyl phenolate is employed within the range of about 0.5–2.0% by weight on the basis of the refined mineral lubricating oil; and the zinc alkyl phenolate is employed in conjunction with the magnesium alkyl phenolate in a proportion of about 0.25–1.5% by weight on the basis of the lubricating oil.

This combination of the two phenolate additives in the proportions listed provides a superior crank case lubricant which greatly improves the engine cleanliness over the base lubricating oil alone, and which does not objectionably increase or alter the character of the combustion chamber deposits when the engine is operated at high power conditions on highly leaded fuel over the deposits normally obtained with the base lubricating oil alone, whereby spark-plug fouling and preignition with premature loss of power of the engine are avoided. This result is all the more unexpected, since each of the said magnesium and zinc alkyl phenolate additives, when used alone, is comparatively ineffective in improving engine cleanliness.

In order to obtain magnesium and zinc alkyl phenolates which are satisfactorily soluble in the mineral lubricating oil and impart proper stability thereto in storage, and also function properly in use, it has been found desirable to prepare these two additives in the following manner.

A phenol or other suitable monohydroxy aromatic compound is alkylated with a selected olefin or olefin polymer of the proper chain length, namely from 15 to 30 carbon atoms, in the presence of a suitable alkylation catalyst, such as HF, $AlCl_2 \cdot HSO_4$, $BF_3$, etc. The olefin polymer is preferably prepared by polymerizing propylene under pressure, using for example a $BF_3 \cdot H_2O$ catalyst. The latter is prepared by saturating water with $BF_3$ by bubbling the $BF_3$ gas into a quantity of water until no more of the gas is absorbed. A small amount of the resulting liquid catalyst of the order of about 5–10% by volume based on the liquid volume of the propylene, is charged to a stirred autoclave reactor, maintained at a temperature of about 150° F.; and the propylene is then introduced at a feeding pressure of about 100 pounds per square inch. Stirring is continued at this temperature for about two hours. This procedure is found to give a satisfactory yield of liquid polymer in the $C_{18}$–$C_{30}$ range. The resulting liquid polymer is then fractionated at 1–2 mm. of Hg absolute pressure to obtain cuts of the desired carbon atom content, as for example, a cut having a boiling range of 100–120° C. (212–248° F.) with an average carbon atom content per molecule of 18, a cut of 120–140° C. (248–284° F.) for an average $C_{20}$ chain length, a cut of 140–160° C. (284–320° F.) for an average $C_{23}$ chain length, and a cut of 160–180° C. (320–356° F.) for an average $C_{26}$ chain length. It is, of course, obvious that broader or narrower cuts of the polymer within the $C_{15}$–$C_{30}$ range can be taken, depending upon the particular chain length of mixed carbon atom content desired. In addition to propylene polymer, butylene or other low molecular weight olefin polymers may be employed. However, from the standpoints of product quality and yield, propylene polymer is preferred.

Any monohydroxy mononuclear aromatic compound having the hydroxyl group attached to the ring can be employed as a starting material in preparing the additives of the present invention. For example, phenol, the cresols, the xylenols, and other alkyl phenols, may be used. In addition, the monohydric polynuclear aromatic compounds having the hydroxyl group attached to the ring, such as the naphthols, are satisfactory. From the standpoints of availability, economy and product quality, simple phenol is preferred. In the following description, phenol will be mentioned by way of example; but it is to be understood that any of the other aforementioned monohydroxy aromatic compounds can be substituted therefor.

In the alkylation of phenol with the selected polymer cut, an essentially anhydrous HF catalyst is preferred from the standpoints of yield, time of reaction and economy. In a suitable batch alkylation procedure, the phenol, propylene polymer and anhydrous HF are added to a stirred reactor, and the contents heated to a temperature of about 100–175° F., and preferably around 125–150° F., under sufficient pressure to maintain the HF in liquid phase. The mol ratio of phenol to polymer is maintained between 3:1 and 5:1, preferably about 3:1. The mol ratio of HF to polymer is maintained between 3:1 and 8:1, preferably about 5:1. The contents are stirred at the reaction temperature for about 30–60 minutes, preferably about 30 minutes. At the end of the reaction period, the bulk of the HF is then removed from the reactor by releasing the pressure and distilling at about 212° F. to effect a recovery of about 95–98% of the HF for reuse in the process. The contents of the reactor are then discharged into a dilute alkaline solution, such as a 10% caustic soda solution or a 25% sodium carbonate solution, to effect neutralization of the remaining acid. The aqueous layer is then separated and the crude alkyl phenol washed with hot water for removal of unreacted phenol. Water is then removed from the product by atmospheric distillation and the crude alkyl phenol then distilled under high vacuum of about 1–2 mm. Hg. pressure absolute to about 170° C. (338° F.) to remove unreacted polymer which can be recovered for reuse. The bottoms product from this distillation represents the desired alkyl phenol which is employed to form the metallic salts as hereinafter described.

The alkylation may also be carried out continuously under the reaction conditions set forth above by continuously charging phenol, polymer and makeup HF to an alkylation reactor of the internal or external recirculating type. A stream of the recirculating emulsion is continuously withdrawn from the system in proportion to the rate of fresh feed, this stream being passed to a gravity settler where the acid layer settles out for recycling to the alkylation reactor. The separated product then passes to an HF stripper where remaining HF is distilled overhead for recycling to the reactor. The bottoms product then passes to a second still where unreacted phenol is stripped from the product for recycling to the reactor. The bottoms product is then neutralized, washed, and finally distilled under high vacuum to remove unreacted polymer for recycling to the reactor, and obtain the desired alkyl phenol as a bottoms product. A yield of about 70–80% of theoretical is obtained by this process.

Another alkylation procedure which can be employed to prepare alkyl phenol in high yield and of good quality is the following. An $AlCl_2 \cdot HSO_4$ complex catalyst employed in this process is prepared by reacting equal molar quantities of anhydrous aluminum chloride and concentrated $H_2SO_4$ (95%) at a temperature of about 35° C.–70° C. When the reaction has been initiated as evidenced by copious evolution of HCl, the reactants are then cooled in a water bath with continued stirring to prevent a temperature rise above about 100–110° C. until the evolution of HCl has subsided. The resulting solid complex product is then pulverized by grinding.

In a batch alkylation procedure, a mixture of phenol with about 10–30%, and preferably about 20%, by weight of the complex catalyst is charged to a stirred reactor and heated to about 120–160° F., preferably about 140° F. The propylene polymer is then added slowly to the reactor with continued stirring at this temperature, until the mol ratio of phenol to added polymer is about 2:1 to 6:1, preferably about 3:1. Thereafter the reactor and contents are heated to about 170–180° F., preferably about 176° F. with continued stirring for about 4 to 12 hours, preferably about 6 hours. At the end of the alkylation period, dilute HCl is slowly added to the reactor to hydrolyze the catalyst. The acid layer is then withdrawn, and the remaining acid and unreacted phenol removed from the product by washing with hot water. The crude product is then refluxed with alcoholic caustic soda for several hours, during which time approximately half of the alcohol is removed through a condenser trap. The excess NaOH is then neutralized with concentrated HCl, additional water added, and the salt water layer withdrawn. A low boiling organic solvent, such as ether, is then added, and the solution of crude alkyl phenol washed with water until acid-free. The ether is then evaporated and the alkyl phenols topped to 160° C. (320° F.) at 1.5 mm. Hg absolute pressure to remove unreacted polymer overhead. A yield of about 70–80% by weight of theoretical of the desired alkyl phenol is obtained by this procedure.

An alternate procedure utilizing the $AlCl_2 \cdot HSO_4$ catalyst involves carrying out the alkylation step as described above, after which the reaction mix is cooled to about 110° F. A hydrocarbon solvent, such as hexane, together with a solid filter-aid material, such as "Filter-cel," are then added and the mixture filtered to remove the catalyst. The filtrate is then heated for the purpose of distilling off the hexane and excess phenol. The crude alkyl phenol, either with or without further purifying treatment, is then topped to about 170° C. (338° F.) at 1.5 mm. Hg absolute pressure to remove unreacted polymer and obtain the alkyl phenol as a bottoms product.

The above described method of alkylating phenol or other hydroxy aromatic compound with olefin polymer in the presence of HF catalyst is more particularly disclosed and claimed in the copending application of Louis P. Bos, Serial No. 143,784, filed February 11, 1950. The above described method of alkylating phenol or other hydroxy aromatic compound with olefin polymer in the presence of AlCl₂·HSO₄ catalyst is more particularly disclosed and claimed in the copending application of Herman D. Kluge and Fred W. Moore, Serial No. 143,782, filed February 11, 1950.

In addition to the alkyl phenols prepared as described above, a satisfactory C₁₅ alkyl phenol for the present purpose, namely 3-pentadecyl phenol, is obtained by hydrogenating cardanol. Moreover, as pointed out hereinbelow, the conventional diamyl phenol may also be employed to produce the zinc alkyl phenolate, provided the latter is used in conjunction with a C₂₀ or higher alkyl magnesium phenolate.

The synthesis of the magnesium alkyl phenolate from the above-described alkyl phenol is carried out in the manner disclosed and claimed in the copending application of John W. Hutcheson, Serial No. 143,761, filed February 11, 1950 which issued September 16, 1952, as U. S. 2,610,982. In that procedure, a quantity of the alkyl phenol in solution in an aromatic solvent, such as toluene, is charged to a stirred reactor fitted with a condenser having a water trap. The reactants are rendered substantially anhydrous by drying at a toluene refluxing temperature, any separated water collecting in the water trap being removed. Magnesium methylate is prepared in a separate reactor by adding magnesium turnings to absolute methyl alcohol in the proportion of 1 atom of magnesium per liter of alcohol. The resulting magnesium methylate dissolved in excess methyl alcohol is then added dropwise at 40–50° C. to the first mentioned stirred reactor until slightly less than the theoretical amount (½ mol per 1 mol of the alkyl phenol) has been added. The temperature is then increased and the methyl alcohol distilled over is removed by the trap. The resulting toluene solution of magnesium alkyl phenolate, which latter is represented by the following formula

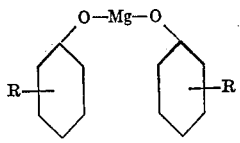

is filtered while hot, and then sufficient mineral lubricating oil, such as a distillate oil having a SUS viscosity at 100° F. of about 300, is added to produce an ultimate 25% concentrate of the magnesium alkyl phenolate in the lubricating oil. The toluene solvent is then stripped from the lubricating oil concentrate. Where the resulting concentrate tends to gel on standing, and also to improve the solubility of the product in the residual type of airplane oil, the gel-like product is heat treated with stirring at a temperature of about 125° C. (257° F.) for about 4–8 hours, whereupon the product becomes entirely fluid and remains fluid when cooled to room temperature.

The preparation of the zinc alkyl phenolate from the above described alkyl phenol is carried out in the manner more particularly described and claimed in the copending application of John W. Hutcheson and Edwin C. Knowles, Serial No. 143,762, filed February 11, 1950 which issued July 21, 1953 as U. S. Patent No. 2,646,402. In this procedure, the alkyl phenol together with a substantial quantity of butyl alcohol are charged to a stirred reactor equipped with a condenser. Anhydrous conditions are maintained throughout the reaction. While heating at about 70° C. with stirring, an anhydrous zinc salt, such as zinc acetate, is added and the temperature maintained for about 1½ hours. In a separate reactor, metallic sodium is reacted with butyl alcohol to form sodium butylate. The sodium metal is preferably cut and kept under dry toluene prior to its use to maintain the desired anhydrous conditions. The resulting sodium butylate solution is then added to the reactants in the first mentioned reactor, and the reactants heated at butyl alcohol reflux temperature for at least 24 hours to complete the reaction and obtain a product which is susceptible to ready filtration for the removal of precipitated salt, namely sodium acetate when zinc acetate is used. Mineral lubricating oil is then added, and the solvent is stripped from the product to obtain an impure zinc alkyl phenolate as a concentrate of about 50% in the lubricating oil. To complete the purification of the product, a light hydrocarbon solvent such as pentane is then added, the resulting mixture filtered and the light hydrocarbon solvent stripped.

The foregoing methods of synthesis have been set forth in detail, since it has been found that the procedure is important in producing magnesium and zinc alkyl phenolates of satisfactory solubility and stability in residual airplane lubricating oils, as well as of desired quality to accomplish the results of the present invention. The resulting concentrates are then blended in a suitable airplane engine lubricating oil in amounts to give the above specified proportions of magnesium alkyl phenolate and zinc alkyl phenolate in the final compounded oil.

Where an airplane engine oil which is adapted for high-power high-temperature service is desired, a highly refined residual lubricating oil from a paraffin base crude is selected. This residuum is refined by solvent deasphalting, solvent refining, solvent dewaxing, clay contacting and clay filtering. The resulting refined residual lubricating oil preferably has an SUS viscosity at 210° F. of about 80–130. For best results, the magnesium alkyl phenolate is employed within the range of 0.75–1.5% by weight on the basis of the lubricating oil; and the zinc alkyl phenolate is employed within the range of 0.3–1.0% by weight. Very satisfactory results have been secured with a lubricating oil of this type containing by weight 1% of magnesium alkyl phenolate and 0.5% of zinc alkyl phenolate, wherein the alkyl group substituted on each benzene nucleus in each of the said magnesium and zinc compounds contains from 20 to 25 carbon atoms.

The structural formula listed above for the magnesium alkyl phenolate, which also applies to the zinc compound except that Zn is substituted for the Mg in the formula, shows each benzene nucleus to be mono-alkylated. This apparently occurs mainly in the para position. While this is believed to be the predominant component of the compounds obtained by the foregoing procedure, it is pointed out that the alkyl substituent may also be in the ortho or meta position. Any one or a mixture of the foregoing monoalkylated compounds can be employed. Moreover, the benzene nucleus may also be dialkylated as described in greater detail hereinbelow. With the procedure described immediately above, the presence of a substantial proportion of such polyalkylated phenol in the product is thought unlikely, since there is invariably unreacted phenol remaining in the alkylated product, and chemical analysis of the metallic salt produced from the alkyl phenol appears to confirm the fact that the product is mainly mono-alkylated.

The superior cleanliness properties of the compounded oil of the present invention are illustrated in the following Table I, which sets forth the results of CFR high speed engine tests on an airplane engine lubricating base oil containing this particular combination, in comparison with the said base oil containing other metallic phenolate combinations, as well as in comparison with the magnesium and zinc alkyl phenolates used alone in the said base oil.

This CFR high speed engine test was developed to provide a reliable screening test for determining the ability of an oil to reduce engine deposits under severe operating conditions. This test is carried out with a standard CFR single cylinder internal combustion engine operating under the following conditions:

Compression ratio, 6.5:1
Speed, R. P. M., 1800
Air fuel ratio, 13:1
Jacket temperature, 285° F.
Oil in temperature, 185° F.
Oil out temperature, 200° F.
Fuel, 100 octane (minimum) aviation type containing 4 cc. TEL/gal.
Duration of run, 50 hrs.

In this test, electrical measurements are taken of the piston skirt deposit with respect to the extent or percentage of surface area of the piston skirt which is covered by the lacquer deposit at the termination of each run, together with the average thickness of the deposit expressed as inches times $10^{-4}$. Also, the carbonaceous deposits in the piston ring grooves are carefully scraped off and weighed. Extensive laboratory testing has shown that a crank case lubricating oil which will markedly reduce the tough black lacquer deposit on the piston skirt and the carbonaceous deposits occurring in the ring belt area, can be expected to reduce deposits at all points where high temperatures are encountered. The tests listed are therefore an accurate indication of the engine cleanliness of the oil compositions under test. Good reproducibility from run to run is obtained in the piston skirt lacquer deposit; but the carbonaceous deposits in the ring belt area may vary rather substantially on duplicate runs. Consequently, the electrical measurements of the thickness of the piston skirt deposit and the per cent covered are mainly relied on in this test.

The following results are typical of those obtained on an airplane engine lubricating base oil containing the various metallic phenolates in the proportions by weight based on the oil, as listed:

TABLE I

*CFR high speed engine tests*

| Additives | Piston Skirt Deposit | | Ring Groove Deposit in g. |
|---|---|---|---|
| | Percent Covered | Thickness In. × 10⁻⁴ | |
| 1. None (Base Oil) | 80 | 2.0 | 2.5 |
| 2. 1% Li P-19+1% Pb diamyl P | 35 | 0.09 | 1.47 |
| 3. 1% Li P-24+0.5% Pb P-24 | 21 | 0.03 | 1.39 |
| 4. 1% Li P-19+0.5% Sb diamyl P | 70 | 0.22 | 0.96 |
| 5. 1% Li P-24+1.0% Pb P-24 | 0 | 0.00 | 0.78 |
| 6. 1% Mg P-24+0.5% Sn P-24 | 15 | 0.12 | 0.83 |
| 7. 1% Mg P-24+1.0% Sn P-24 | 36 | 0.23 | 0.96 |
| 8. 1% Mg P-23+1.0% Sn P-24 | 16 | 0.02 | 0.73 |
| 9. 1% Mg P-24+1% Pb P-24 | 13 | 0.02 | 0.97 |
| 10. 1% Pb P-19+1% Sn diamyl P | 71 | 2.10 | 2.10 |
| 11. 1% Mg P-24+0.5% Zn P-24 | 0 | 0.00 | 0.84 |
| 12. 0.5% Mg P-24+0.5% Zn P-24 | 5 | 0.01 | 1.03 |
| 13. 1.5% Mg P-24+0.5% Zn P-24 | 13 | 0.03 | 0.98 |
| 14. 1% Mg P-24+1% Zn P-24 | 0 | 0.00 | 0.45 |
| 15. 1% Mg P-24 | 60 | 0.58 | 1.32 |
| 16. 0.5% Zn P-23 | 85 | 1.51 | 2.39 |

In the foregoing table, the letter "P" designates phenolate and the numeral following the "P" indicates the carbon atom content of the alkyl group substituted on each benzene nucleus; thus Mg P-24 represents a magnesium alkyl phenolate prepared from an alkyl phenol wherein the alkyl group substituted on the benzene nucleus contains an average of 24 carbon atoms. Run No. 1 shows typical results secured with the highly refined airplane engine lubricating oil alone, demonstrating its inability to prevent very substantial lacquer and carbonaceous deposits on the engine parts in this high temperature service. Runs 15 and 16 illustrate that neither the magnesium alkyl phenolate nor the zinc alkyl phenolate, when used alone in the base oil, is capable of maintaining a clean engine in this high temperature service. On the other hand, runs 11 and 14 are representative of the unusual effectiveness of the magnesium and zinc phenolate combination, when using alkyl phenolate compounds of the proper chain length and in the proper proportions, in entirely preventing measurable lacquer deposition and greatly reducing carbonaceous ring groove deposits. Runs 12 and 13 show the effect of varying the proportions of this Mg-Zn combination, and are representative of about the lower and upper limits respectively for the proportion of the magnesium compound when employed with 0.5% of the zinc compound.

Runs 2-10 inclusive are included to illustrate the effect of other metallic phenolate combinations on engine cleanliness in this test. These results show that the combination of lithium phenolate with lead phenolate, and the combinations of magnesium phenolate with either tin or lead phenolate, when the alkyl group is of high molecular weight, have fair engine cleanliness properties. Run 5 is outstanding in this respect. But in the case of these metallic combinations other than Mg-Zn which exhibit engine cleanliness properties, visual observation showed that the combustion chamber deposits were either materially increased over that secured with the base oil alone, or were of a modified stalagmite-stalactite formation which is known to promote preignition. On the other hand, the combustion chamber deposits with the Mg-Zn combination of runs 11–14 inclusive were found by visual observation to be similar to the type secured with the base oil alone, and which is relatively free from the difficulties of spark-plug fouling and preignition. As pointed out above, in order to justify the use of additives in this service, the compounded oil must be capable of greatly improving the engine cleanliness properties of the base oil, and at the same time must not substantially increase the difficulties due to preignition and spark-plug fouling from the combustion chamber deposits. The Mg-Zn combination is outstandingly superior and unique in this respect.

In order to illustrate the effect of the alkyl chain length on the engine cleanliness properties of the Mg-Zn combination, the following Table II sets forth the results of additional representative runs, as made by the above described CFR high speed engine test:

TABLE II

*CFR high speed engine tests*

| Additives | Piston Skirt Deposit | | Ring Groove Deposit, g. |
|---|---|---|---|
| | Percent Covered | Thickness In. ×10⁻⁴ | |
| 1. None (Base Oil) | 80 | 2.0 | 2.5 |
| 2. 1% Mg diamyl P+0.5% Zn diamyl P | 36 | 0.42 | 1.38 |
| 3. 1% Mg P-15+0.3% Zn diamyl P | 36 | 0.24 | 0.86 |
| 4. 1% Mg P-15+0.5% Zn P-15 | 2 | 0.02 | 0.89 |
| 5. 1% Mg P-15+0.5% Zn P-21 | 0 | 0.00 | 1.26 |
| 6. 1% Mg P-17.5+0.5% Zn P-17.5 | 16 | 0.02 | 1.54 |
| 7. 1% Mg P-20+0.5% Zn P-20 | 0 | 0.00 | 0.95 |
| 8. 1% Mg P-21+0.3% Zn diamyl P | 4 | 0.01 | 0.75 |
| 9. 1% Mg P-21+0.5% Zn P-21 | 0 | 0.00 | 0.42 |
| 10. 1% Mg P-23+0.5% Zn P-23 | 0 | 0.00 | 0.37 |
| 11. 1% Mg P-23+0.5% Zn P-21 | 0 | 0.00 | 0.43 |
| 12. 1% Mg P-24+0.5% Zn P-24 | 0 | 0.00 | 0.88 |

Runs 2 and 3 show that the combination of the magnesium and zinc diamyl compounds is comparatively inferior in engine cleanliness properties, as is also true of the combinations of Zn diamyl compound with a C₁₅ alkyl magnesium compound. Run 4, employing compounds with an alkyl side chain length of 15 prepared from hydrogenated cardanol, represents about the lower limit for carbon atom content of the alkyl side chain to attain effective engine cleanliness. Runs 7 and 9–12 inclusive illustrate that the C₂₀ to C₂₅ alkyl phenolate compounds are outstanding and are generally preferred for this service. Run 8 is included to illustrate an exception to the foregoing generalizations. Thus zinc diamyl phenolate can be employed in the combination with fair results, provided it is used with a high molecular weight (C₂₀ to C₂₅) magnesium alkyl phenolate.

As illustrative of a preferred example of the present invention, the following tables set forth results obtained in various bench and engine tests on an airplane engine lubricating oil containing 1% magnesium alkyl phenolate and 0.5% zinc alkyl phenolate. Typical tests on the base oil and the base oil containing this combination of additives are set forth in the following Table III:

TABLE III

| Tests | Base Oil | Base Oil+1% Mg P-21+ 0.5% Zn P-21 |
|---|---|---|
| Gravity, ° API | 27.7 | 27.0 |
| Flash, COC, ° F | 555 | 550 |
| Fire, COC, ° F | 620 | 617 |
| Vis., SUS, 100° F | 1,693 | 1,610 |
| Vis., SUS, 210° F | 120 | 117 |
| Vis Index | 96.6 | 97.0 |
| Color, TR | 2¾ | 2¾ |
| Pour, ASTM, ° F | 15 | 5 |
| Corrosion, Cu Strip, 212° F | Negative | Negative |
| Carbon Residue, percent | 0.38 | 0.42 |
| Precipitation No | Trace | Trace |
| Neut. No | 0.08 | 0.06 |
| Ash, percent | 0.0001 | 0.09 |

In order to further evaluate the engine cleanliness and combustion chamber deposit forming characteristics, the following tests of Table IV were made on the base oil in comparison with the base oil containing the preferred Mg-Zn combination:

TABLE IV

| | Base Oil | Base Oil+1% Mg P-21+ 0.5% Zn P-21 |
|---|---|---|
| Toettcher Varnish Test: Varnish, mg | 30 | 0.5 |
| High Temperature (525° F.) Deposits Test: Deposit, mg | 124 | 5 |
| CFR High Speed Engine Test (50 hrs.): Total Combustion chamber deposit, g | 6.5 | 7.5 |
| Metal analysis of deposit Lead, percent | 100 | 91.3 |
| Additive metals, percent | | 8.7 |

The above listed Toettcher varnish test is a bench test wherein a sample of the test oil in a stainless steel beaker is placed in an oil bath maintained at 350° F., for 13 hours. The oil is agitated by a centrifugal mixer, and reaction is catalyzed by 2 copper baffles immersed in the test oil. A weighed glass cylinder is also immersed in the test oil. The weight of varnish deposited on the glass cylinder at the termination of the test is determined by the increase in weight of the cylinder. The varnish is the solid material remaining deposited on the glass cylinder when the latter is washed with gasoline and dried.

The high temperature deposits test of the foregoing table is also a bench test wherein an aluminum cylinder one inch in diameter and three inches long is repeatedly dipped into a beaker containing a sample of the test oil maintained at 525°° F. for a period of 20 hours. The deposit remaining on the test specimen after washing with pentane and drying, is determined.

Both of the above described bench tests show the compounded oil of the present invention to be greatly superior to the base oil in deposit-forming tendencies. These deposit tests correlate with the lacquer forming properties of the oil in service, and can be used for that purpose.

Table IV also sets forth typical results obtained in the above described high speed CFR engine test on combustion chamber deposits. These tests confirm the visual observation to the effect that the compounded oil does not substantially increase the total amount of the deposit or the character of the deposit over the base oil. The latter is indicated both by visual observation of its physical character, as well as by the chemical analysis of the metal content of the deposit. The foregoing table shows that the combustion chamber deposit is still primarily composed of lead, which comes from the leaded fuel, in the case of the compounded oil, and that the additive metals in the oil form only a very small proportion of the deposit. This is a characteristic which has been found to be important in the prevention of spark-plug fouling and preignition. Thus, where the additive metals in the lubricating oil combine with the lead from the leaded fuel to a substantial extent in building up the deposit, the latter is not only increased in amount but is also changed in physical form and configuration to the stalagmite-stalacite type which promotes preignition and spark-plug fouling.

In order to further evaluate aircraft engine oils as to their tendencies to form combustion chamber deposits which induce preignition, the following engine test has been developed. The standard CFR high speed engine was modified by recessing the cylinder liner at the upper end of piston travel to promote oil "throw-off" from the top of the piston, which is conducive to localizing combustion chamber deposits. In addition, the cylinder bore finish was controlled by honing, and the lower compression and upper oil control rings on the piston were removed to provide for high oil consumption of the engine of the order of about 0.030–0.036 pound per indicated horsepower per hour, which is substantially in excess of the recommended average overall engine oil consumption for aircraft engines of current manufacture of about 0.015. Since preignition and spark-plug fouling as encountered with certain types of combustion chamber deposits has a direct relationship to the amount of oil leakage past the piston and into the combustion chamber, the foregoing measures to provide high oil consumption with localization of the oil throw-off are designed to rapidly produce combustion chamber deposits which result in preignition or spark-plug fouling during the operation of the engine. In order to minimize ring sticking under these conditions, the G-99 aluminum piston was altered by machining the piston underhead to remove a ring of metal from the inner wall of the piston opposite the piston ring grooves. This in effect places all rings in the thin wall of the piston, and eliminated a direct heat conducting path through the metal piston wall behind the rings, thereby redirecting the heat through the ring belt area.

Since it is known that preignition occurs usually after prolonged periods of "cruise" operation, the modified CFR engine was operated in this test under the following conditions chosen to simulate flight cruise conditions:

Engine R. P. M. (chosen to simulate piston acceleration speeds rather than actual engine R. P. M.)_____ 2500
IMEP, lbs. per sq. in_____ 160
Jacket temperature, °F_____ 285
Oil to bearings, °F_____ 185
Intake air temperature, °F_____ 190
Fuel-air ratio_____ 0.065
Spark advance, °BTC_____ 20

In the following test runs, the engine was allowed to continue operation until it automatically stopped as a result of preignition. In other words, the test runs were "self-terminated." The engine stoppage usually occurred after a period of many repeated cycles of knocking and speed fluctuations. These cycles commonly started with infrequent and irregular ignition "knocks," which gradually became severe and were later accompanied by losses of speed and power. A rather prompt recovery of speed and power occurred after each loss; however, the cycle frequency and severity increased until the cycles became overlapping, at which time "self-termination" occurred.

The following results were obtained in the above described preignition engine test on the airplane base oil the same plus the additives of the present invention, and the base oil plus the barium sulfonate and tin diamyl phenolate combination previously found to maintain excellent engine cleanliness:

TABLE V

*Preignition engine tests*

| | Base Oil | Base Oil+1% Mg P-21+0.5% Zn P-21 | Base Oil+Ba and Sn type additives |
|---|---|---|---|
| Test Duration, hrs | 71 | 75 | 12½. |
| Terminating conditions | Self-terminated; Lost Power and speed. | Self-terminated; No knocking or speed fluctuation | Self-terminated; Lost power and speed. |
| Total combustion chamber deposit wt., g. | 17.44 | 13.24 | 6.12. |
| Deposit appearance | Porous, trace molten flaky. | Flaky, porous | Stalagmatic, granular, heavy flaking. |
| Analysis of cylinder head deposit: | | | |
| Density | 5.28 | 2.09 | 1.91. |
| Percent C | 5.9 | 9.6 | 10.3. |
| Percent Pb | 63.5 | 47.1 | 30.2. |
| Percent Mg | | 5.7 | |
| Percent Zn | | 5.4 | |
| Percent Ba | | | 17.0. |
| Percent Sn | | | 9.9. |
| Percent Pb in total metals | 100 | 80.9 | 52.9. |
| Wt. percent Ash in new oil | 0.01 | 0.10 | 0.55. |
| Wt. percent Ash in used oil | 0.06 | 0.16 | 0.58. |

As will be noted from the foregoing table, the compounded oil of the present invention provided a run of longer duration with a smaller combustion chamber deposit per unit of time than even the base oil alone. A comparison with the results obtained on the barium and tin type additive oil, which latter is excellent with respect to engine cleanliness, clearly shows the superior effect on combustion chamber deposit tendency of the present oil. Thus the prior type of additive oil resulted in self-termination of the engine run in ⅙ of the time of the run on the compounded oil of the present invention; and the rate of combustion chamber deposit build-up of the prior additive oil was nearly three times that of the present compounded oil. Here again the stalagmatic granular type of combustion chamber deposits were evident in the case of the prior compounded oil, which further confirms that this type of deposit promotes preignition and loss of power of the engine. On the other hand the combustion chamber deposits in the run on the present compounded oil were of the same flaky porous type as were obtained in the case of the base oil alone.

The chemical analysis of the cylinder head deposit in each case again confirms the fact that the present oil contributes only a very small proportion of its additive metal content to the lead and carbon of the normal combustion chamber deposits; whereas the prior additive oil contributed a very much higher proportion of additive metals to the total deposits. The per cent ash in the oil appears to be an indication of the tendency of the oil to form objectionable combustion chamber deposits in service, as evidenced by the prior type of additive oil with high ash content in comparison to the present oil with relatively low ash content.

Full scale engine tests in a multicylinder aircraft engine also demonstrated the superiority of the compounded oil of the present invention as an aircraft engine oil. In this test, a Pratt and Whitney Twin Wasp R-2000 engine was employed, this engine having the following specifications and being operated under the following conditions:

Engine type—2 row, radial, air-cooled
Number cylinders—14
Bore and stroke inches—5.75 x 5.50
Total displacement—cubic inches—2,000
Compression ratio—6.5:1
Duration—300 hours comprising series of simulated flights as outlined below
Oil in temperature—165° F. (230 hours) and then 180° F. (70 hours)
Air temperature—80° F.
Fuel—grade 100/130 aviation gasoline containing 2.99 cc. TEL/gal.

As noted above, a cycling test procedure, involving a series of 2 hour, 32-minute flights throughout the 300-hour test period, was employed. Each 2 hours, 32-minute flight was conducted on the following operating schedule:

| Condition on Cycle | First 100 hours | 100–300 hrs. |
|---|---|---|
| "Take-Off," 48.5 in. Hg AMP | 2 minutes | 2 minutes. |
| "Climb," 40 in. Hg AMP | 15 minutes | 15 minutes. |
| "Cruise," 32 in. Hg AMP (70% power, 89% speed). | 2 hours | 1 hr. 45 minutes. |
| "Approach": | | |
| 28 in. Hg AMP | 5 minutes | 5 minutes. |
| 24 in. Hg AMP | do | Do. |
| 20 in Hg (600 R. P. M.—Idle) | do | 20 minutes. |

During the test, the rear spark plug gasket temperature on the hottest cylinder was controlled to 500° F. during "take-off" and "climb" and to 450° F. during "cruise." The test was conducted on a two shift (17 hours per day) 5 day per week schedule, with shutdown over the weekend.

Makeup oil was added as required at the end of a "cruise" period.

The following Table VI sets forth the results obtained in the above test on the oil of the present invention (middle column) in comparison with the base oil (left hand column) and the base oil containing the barium and tin type additives mentioned above (right hand column):

TABLE VI

*Pratt & Whitney R-2000 engine tests*

| Results of visual inspection | Base Oil | Base Oil+1% Mg P-23+0.5% Zn P-23 | Base Oil+Ba and Sn type Additives |
|---|---|---|---|
| Rings | Three No. 2 rings partially stuck. | All free | All free. |
| Piston Skirt | Light to heavy black lacquer. | Light to medium brown lacquer. | Light to medium brown lacquer. |
| Cylinder Walls | Medium brown stain | Light brown stain | Light brown stain. |
| Piston Tops | Trace to medium flaked lead deposits; No. stalagmites. | Light to medium flaked lead-like deposits; No. stalagmites. | Light to medium heavy deposits with stalagmites. |
| Combustion Chamber Heads. | Trace to light flaked lead deposits at outer edge. | Light to medium flaked lead-like deposits, heaviest at outer edge. | Light to heavy flaked deposits with stalactite formations. |

| Combustion Chamber Deposit Analysis | Base Oil | Base Oil+1% Mg P-23+0.5% Zn P-23 | | Base Oil+Ba and Sn type Additives | |
|---|---|---|---|---|---|
| | | Piston Crown | Cylinder Head | Piston Crown | Cylinder Head |
| Total oil-free deposit, g | | 3.72 | 1.85 | 11.5 | 6.0 |
| Pb, percent | | 50.4 | 60.2 | 46.6 | 34.1 |
| Mg, percent | | 3.5 | 3.4 | | |
| Zn, percent | | 4.9 | 4.6 | | |
| Ba, percent | | | | 12.5 | 19.2 |
| Sn, percent | | | | 10.5 | 15.1 |
| Percent Pb in total metals | | 85.7 | 88.3 | 67.0 | 49.9 |
| Cylinder Wear: Run Average In.×10⁻⁴ | 5.8 | | 4.2 | | 8.0 |

In the standard procedure employed in the tests on the base oil and the oil with the barium and tin type additives of the foregoing table, an engine preservative oil was utilized to protect the engine parts during the weekend shutdowns, and spark plugs were changed at 150 hours. However, in the test set forth in the foregoing table on the oil of the present invention, preservative oil was not used and no spark plug changes were made throughout the run in order to accentuate any possible spark plug fouling or combustion chamber deposit build-up. At the termination of each of the runs, the engine was completely disassembled and the parts visually inspected.

The foregoing table shows that the base oil alone gave partial ring sticking with considerable lacquer deposition and carbonaceous deposits in this test. On the other hand both of the compounded oils prevented ring sticking and gave a satisfactorily clean engine. However, the combustion chamber deposits as represented by the conditions of the piston tops and the combustion chamber heads show characteristically heavier stalagmite-stalactite formations in the case of the base oil containing the barium and tin type additives; whereas the oil of the present invention gave deposits essentially similar but slightly heavier than those of the base oil. Continuous recordings of cylinder temperature showed characteristic flashes of temperature increase in the case of the barium and tin compounded oil which are indicative of preignition; but no such temperature flashes were experienced and no difficulty from combustion chamber deposits ensued during the run on the compounded oil of the present invention, even under the more rigorous conditions as noted above.

In addition to the visual inspection, the actual combustion chamber deposits were removed from the piston crown and cylinder head of typical cylinders at the completion of the runs on the compounded oils, and these deposits weighed and chemically analyzed. The foregoing table shows the deposits from the present oil to be much lighter and to have characteristically high lead content in comparison to those of the other compounded oil. Further, accurate measurements were made of the cylinder bore diameters before and after the tests to obtain a measure of cylinder wear. The foregoing table shows that the average cylinder wear with the oil of the present invention was less than that experienced with either the base oil or the other compounded oil. The foregoing full scale test proves the satisfactory character of the compounded oil of the present invention to not only greatly improve the base oil from the standpoint of engine cleanliness but also to avoid the formation of objectionable type of combustion chamber deposits in service which result in preignition and spark-plug fouling.

The compounded oil of the present invention is not only superior to the base oil in the foregoing respects but also in oxidation characteristics. This is illustrated in the following Table VII which sets forth the results obtained in various comparative engine tests on the base oil and the present compounded oil with respect to oxidation stability as measured by the neutralization number of the used oil, and the per cent viscosity increase of the used oil over that of the charge oil:

Top ring travel temperature:
Cylinder 1 _____ 410° F.
Cylinder 2 _____ 390° F.
Cylinder 3 _____ 420° F.
Cylinder 4 _____ 350° F.

The severity of these operating conditions is conducive to rapid ring sticking and engine deposits, resulting in excessive blowby, oil consumption or other operational failure. The test is continued by both procedures until some type of operational failure occurs, or until some arbitrary time which in the case of the experimental oil was 170 hours.

The foregoing Table VII shows that the compounded oil of the present invention gave consistently lower neutralization numbers on the used oil at the termination of the various engine tests than the base oil. Likewise, the per cent viscosity increase of the used oil in the case of the present compounded oil was also consistently lower. While the figures recorded for per cent viscosity increase in the Continental engine test in one case is higher for the present oil, it will be noted that this oil operated about 10 times as long in this test as the base oil. Consequently, the per cent viscosity increase per unit of time is substantially less for the present compounded oil. The operation of the 100 grade oil of the present invention in this rigorous test for the full period of 170 hours is outstanding.

The oil of the present invention also exhibits substantially improved anti-corrosive properties over the base oil with respect to the bearings employed in aircraft engines. This is shown in the following Table VIII, which sets forth the results obtained in comparative tests on the

TABLE VII

|  | Neut. No. | | Percent Vis. Increase | |
|---|---|---|---|---|
|  | Base Oil | Base Oil +1% Mg P +0.5% Zn P | Base Oil | Base Oil +1% Mg P +0.5% Zn P |
| Chevrolet CRC L-4 Engine Test, 36 hrs | 6.2 | 2.9 | 22.5 | 15 |
| CFR High Speed Engine Test, 50 hrs | 0.7 | 0.05 | 6.7 | 3.8 |
| Continental Engine Test: | | | | |
| 80 Grade | 1.09 (13 hrs.) | 0.97 (128½ hrs.) | 5.5 | 12.3 |
| 100 Grade | 5.5 (37¾ hrs.) | 0.4 (170 hrs.) | 43.0 | 20.8 |
| Pratt & Whitney R-2000 Engine Test, 300 hrs | 0.52 | 0.31 | 5.8 | 3.6 |

The Chevrolet CRC L-4 test of the foregoing table is the well-known standard 36 hour motor oil engine test (Coordinating Research Council L-4-545, CLR Research Test Procedure for Determining Oxidation Characteristics of Heavy Duty Crank Case Oils—U. S. Army Ordnance Specification AXS-1554).

The Continental engine test of the foregoing table was carried out on a 4-cylinder Continental A-80 engine, and is recognized as a means of crankcase oil evaluation intermediate between the CFR high speed engine test and the full scale Pratt & Whitney engine test. Two procedures are employed, namely a run on airplane engine oil of 80 grade (SUS viscosity at 210° F. of about 80) with an unleaded fuel composed of 50% aviation gasoline of about 80 octane plus 50% alkylate, and a second run on airplane engine oil of 100 grade employing aviation gasoline 80 plus 3 cc. TEL per gallon. In both engine runs, the following operating conditions are employed:

Speed, R. P. M. _____ 2400
Load, B. H. P. _____ 58
Oil temperature (gallery), °F. _____ 220
Air/fuel ratio _____ 12.5 : 1 present oil and the base oil in a recognized bench test and several of the above described engine tests:

TABLE VIII

| MacCoull-Scholp Corrosion Test at 350° F. | Base Oil | Base Oil+ 1% Mg P-21+ 0.5% Zn P-21 |
|---|---|---|
| 10 hr. Cu-Pb bearing wt. loss, mg. | 3; 1 | 2; 5. |
| 10 hr. indium plated bearing wt. loss, mg. | 1; 9 | 1; 1. |
| 10 hr. Pb-flashed bearing wt. loss, mg. | 1,051; 842 | 34; 53. |
| Chevrolet CRC L-4 Engine Test: | | |
| 36 hr. bearing wt. loss, g.— | | |
| Cu-Pb | 5.9 | 1.6; 0.7. |
| Pb-flashed | 16.3 | 3.7. |
| Continental Engine Test: | | |
| 80 Grade-Bearing wt. loss, g. | 0.54 (13 hrs.) | 0.36 (128½ hrs.). |
| 100 Grade-Bearing wt. loss, g. | 2.85 (37¾ hrs.) | 0.52 (170 hrs.). |

The MacCoull-Scholp corrosion test of the foregoing table is a recognized bench test for evaluating bearing corrosion properties. This is carried out in the same manner as the well-known MacCoull bearing corrosion test (SAE transactions, volume 50, page 8, August 1942, pages 338–345), except that 1 gram of lead peroxide is added to each 125 cc. of the test oil at two hour intervals to simulate the effect of leaded fuel residues in the oil, as occurs with the use of leaded fuel. The decrease in the bearing weight loss of the lead-flashed bearings, which are customarily found in aircraft engines, by the oil of the present invention is particularly outstanding.

In addition to being satisfactorily non-corrosive to aircraft engine bearings, the compounded oil of the present invention has been found to be non-corrosive to the bronze valve guides of aircraft engines. Other additive type crankcase oils have posed a serious problem with respect to bronze valve guide corrosion, as noted by visual observation and also a measured inside diametral increase of the valve guide of the order of 0.004–0.005 inch in the 50 hour CFR high speed engine test. The oil of the present invention on the other hand gave in this test no increase in valve guide diameter, nor could any corrosion be observed visually. This is another highly desirable requirement for an aircraft engine oil which is satisfactorily met by the oil of the present invention.

While the compounded oil of the present invention is particularly designed and suitable for an aircraft engine oil, it is to be understood that this compounded oil is also satisfactory for engine crank case lubrication generally, and particularly for heavy duty motor oil service of the character of bus and truck engines. While for the purposes set forth above, the base oil requires only the combination of the indicated percentages of the magnesium and zinc alkyl phenolate additives, it is to be understood that other types of additives, particularly of non-metallic composition, can also be included in the oil in the customary small proportions which do not essentially alter the desirable characteristics set forth above. Such additives include pour depressants, viscosity index improvers, other oxidation inhibitors and anti-corrosives, extreme pressure agents, dyes and the like.

*Polyalkylated phenolate additives*

The following example is listed to illustrate the effectiveness for purposes of the present invention of the combination of magnesium and zinc salts of polyalkylated phenols. For this purpose, a $C_9$ olefin polymer was alkylated with phenol with the formation of a dinonyl phenol, and the magnesium and zinc salts of the dinonyl phenol were then prepared and tested. The results show that the lower molecular weight alkyl side chain is satisfactory, provided the sum of the carbon atoms of the alkyl substituents on each benzene nucleus is at least 16 and preferably about 18 or higher.

The dinonyl phenol was prepared in a continuous recirculation type of alkylation reactor by alkylation of phenol with a $C_9$ propylene polymer fraction having a boiling range of 129–149° C., employing $BF_3$ as the catalyst. The reaction was carried out at a temperature of 50–60° C. under a pressure of 15 lbs. per square inch with a contact time of approximately 50 minutes in the reactor. In order to favor the production of the dialkylated product, a phenol to olefin polymer mol ratio of about 0.55:1 was employed. The $BF_3$ to phenol mol ratio in the reaction mix was maintained at about 0.05–0.1:1. During the course of the continuous run, 312 lbs. of phenol were charged to the reactor together with 750 lbs. of the $C_9$ propylene polymer and 22.7 lbs. of $BF_3$ gas. A yield of 1115 lbs. of crude reaction product was obtained.

This crude reaction product was washed with water, then with a dilute sodium bicarbonate aqueous solution, and finally twice again with water. The washed crude product was then distilled at an absolute pressure of 100 ml. mercury to remove water, unreacted polymer and phenol; the vacuum was then increased and distillation continued at an absolute pressure of about 3 mm. mercury to remove overhead a mononyl phenol broad cut having an ASTM 50 per cent distillation point of 325° C. Distillation at the high vacuum was then continued to remove a dinonyl phenol cut through a backtrap on the still until the reboiler temperature of the still reached 240° C. In this particular run the weight per cent yield of the various fractions obtained were 4.8 per cent of unreacted polymer and phenol, 27 per cent of mononyl phenol fraction, 50.3 per cent of dinonyl phenol fraction, and 16.1 per cent of residue which was mainly trinonyl phenol, with a loss of 1.8 per cent. The yield of dinonyl phenol basis the phenol charged was 46.5 per cent by weight. The resulting dinonyl phenol had a molecular weight (by active hydrogen) of 329, a hydroxyl number of 156.4, a refractive index at 20° C. of 1.4983, and a specific gravity at 20/4° C. of 0.908.

The magnesium salt was prepared from a typical sample of the dinonyl phenol as follows:

235 lbs. of dinonyl phenol were charged to a stirred reactor equipped with a reflux, together with 623 lbs. of a mineral lubricating oil calculated to give a 25 per cent concentrate of magnesium salt. 15 gallons of toluene were added. The mixture was heated to distil off the toluene slowly, and finally it was vacuum stripped at 180° C. to remove all of the toluene and obtain an anhydrous solution of dinonyl phenol in the mineral lubricating oil. A previously prepared anhydrous magnesium methoxide solution was then slowly added to the kettle contents maintained at 80–100° C., at the rate of 1.5 lbs. per minute, until 300 lbs. of the magnesium methoxide had been introduced. Methyl alcohol was distilled off at an even rate during the addition, and the last traces of the methyl alcohol were removed by heating under vacuum to 180° C. The resulting lubricating oil concentrate of magnesium dinonyl phenolate

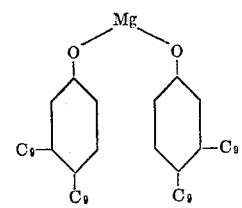

was stirred overnight while being held under vacuum at 180° C., and the product was then cooled below 100° C. before breaking the vacuum through a drying tube. 596 lbs. of a 25 per cent concentrate of active magnesium salt were obtained which had an SUS viscosity at 210° F. of 109 seconds, and analyzed to a magnesium metal content of 0.85 per cent by weight, with a total ash (assume 100 per cent MgO) of 1.41 per cent.

The zinc salt of the foregoing dinonyl phenol was prepared as follows:

21 lbs. of sodium hydroxide were dissolved in 40 gallons of 2-methoxyethanol, and 208 lbs. of dinonyl phenol were added. The mixture was heated to reflux temperature, and the column operated at total reflux until the head temperature was approximately that for the 2-methoxyethanol-water azeotrope (approximately 100° C.), when a small distillate stream was removed. The distillation was continued until the head temperature reached the boiling point of pure 2-methoxyethanol (124.5° C.), when a further small amount of the distillate was removed to insure complete removal of water, leaving an anhydrous solution of the sodium salt in over half of the original solvent. A previously prepared anhydrous solution containing 37 lbs. of zinc chloride in 2-methoxyethanol, was then added slowly to the anhydrous solution of sodium salt, and the mixture maintained at reflux temperature for one hour to complete the reaction. The 2-methoxyethanol was then removed, first by atmospheric distillation and then by vacuum stripping at a pot temperature of 150° C. 30 gallons of dry normal heptane together with a slurry, containing 37.5 lbs. of filter-aid added in 25 gallons of normal heptane, were added, and the mixture filtered through a precoated filter. The normal heptane was then removed from the filtrate by distillation and vacuum stripping, after which 180 lbs. of a mineral lubricating oil were added to produce a 50 per cent concentrate of the zinc dinonyl phenolate. 360 lbs. of the final concentrate were obtained which had an SUS viscosity at 210° F. of 95 seconds, and analyzed to a zinc metal content of 3.2 per cent by weight.

Samples of the foregoing magnesium dinonyl phenolate concentrate and the zinc dinonyl phenolate concentrate were then added to an airplane engine base oil of the character set forth above in amounts to get the indicated percentages of active ingredients by weight as set forth in the following table. These compounded oils were then compared with the base oil in the above described CFR high speed engine test with the following results:

TABLE IX

*CFR high speed engine tests*

| Additives | Piston Skirt Deposit | |
|---|---|---|
| | Percent Covered | Thickness In.×10⁻⁴ |
| None (Base Oil) | 71 | 0.91 |
| 0.875% MP+0.45% ZP | 17 | 0.06 |
| None (Base Oil) | 80 | 2.60 |

In the foregoing table MP stands for magnesium dinonyl phenolate and ZP for zinc dinonyl phenolate, with the percentage figures indicating the weight of actual active salt. The figures given for the compounded oil are the average for three runs. The above listed runs were also bracketed with CFR high speed engine test runs on the preferred Mg P-21 plus Zn P-21 of Table II, and it was found that the results on the dinonyl additives compared favorably with those of the monoalkylated additives. It should be pointed out that this CFR high speed engine test does not always give reproducible results at different periods of time, and the better criterion of performance for purposes of the present invention is obtained by bracketing the runs with additives of known good performance at the time of making the tests on different products.

*Polynuclear additives*

The following is set forth to illustrate the effectiveness of the combination of the magnesium and zinc salts of nuclearly alkylated hydroxy polynuclear aromatic hydrocarbons for purposes of the present invention. In this case, the magnesium and zinc salts were prepared from the alkylation reaction product of beta-naphthol with a butylene polymer having a boiling range of 100-120° C. at an absolute pressure of 0.5 mm. mercury and having a molecular weight of 260, 269, which calculates to an average of $C_{19}$ polymer.

In this run, 288 grams (2 mols) of beta-naphthol and 692 grams (2.5 mols) of the $C_{19}$ butylene polymer were charged to the top of a 2 liter steel side stirred reactor. The mixture was cooled to 20° F., and 290 grams of HF were charged to the reactor and the mixture stirred at 20° F. for 17 hours. The reactor was then pressured with 40 lbs. per square inch nitrogen pressure, and the product drawn off into aqueous alkali. Toluene was added together with enough concentrated hydrochloric acid to make the re-action acid. The toluene layer was separated and washed with water until neutral, using salt when necessary to break any emulsion formed. The toluene was then stripped, and the residue divided into 100 gram portions and each portion dissolved in pentane. The pentane solutions were passed through 6.8 centimeter diameter glass columns, each containing 2000 grams of 28-200 mesh silica gel to adsorb the alkyl beta-naphthol, with each column being washed with pentane until the washings were colorless. The washings were combined and stripped to obtain a residue of 159 grams, which was mainly unreacted polymer. The columns were then washed with ether until the washings became colorless to remove the adsorbed alkyl beta-naphthol. The washings were combined and the ether stripped to obtain a yield of 648 grams of alkyl beta-naphthol having a hydroxyl number of 163. The silica gel adsorption procedure was employed since the boiling points of the products were so high that separation by distillation, without darkening or decomposition, was found difficult.

The preparation of magnesium $C_{19}$ alkyl beta-naphthoxide from a sample of the foregoing alkyl beta-naphthol was carried out as follows. 378 grams (1.1 mols calculated from hydroxyl number) were refluxed in 2000 ml. of toluene under a water separator until dry, with the removal of about 800 ml. of solvent. 495 ml. (0.525 mols) of a 1.06 molar anhydrous magnesium methoxide solution in methanol were added to the cooled toluene solution of alkyl beta-naphthol, and the mixture heated to reflux with solvent being removed under a water trap until the reaction temperature reached 225° F. The reaction mix was maintained at this temperature for 6 hours, and then 1100 grams of a dry mineral lubricating oil were added, sufficient to form a 25 per cent concentrate, and the solvent stripped. The resulting concentrate of magnesium $C_{19}$ alkyl beta-naphthoxide

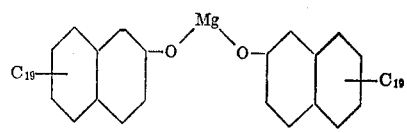

tested 0.88 per cent by weight Mg as compared to a calculated Mg content of 0.86 per cent, and 1.51 per cent ash as compared to a calculated ash content of 1.41 per cent.

The preparation of the zinc salt from a sample of the foregoing C₁₉ alkyl beta-naphthol was carried out as follows: 360 cc. of dry butanol were added to a 2-liter 3-neck flask equipped with a stirrer and reflux condenser. 16 grams (0.7 mol) of metallic sodium were slowly added chunkwise with stirring until solution was complete. The solution was stoppered using a drying tube. To a similar flask but also equipped with condensate trap were added 52.5 grams (0.34 mol plus 10 per cent excess) of zinc chloride together with 300 cc. of dry butanol. The mixture was heated with stirring to reflux temperature, and 125 cc. of butanol were stripped off via the condensate trap. After cooling, the anhydrous solution of zinc chloride in butanol was stoppered using a drying tube.

To a 3-liter 3-neck flask equipped with a stirrer and condenser with condensate trap were added 241 grams (0.7 mol basis hydroxyl number) of the alkyl beta-naphthol together with 360 cc. of dry butanol. The mixture was heated to reflux with stirring, and 110 cc. of butanol were removed via the condensate trap. The flask was fitted with a separatory funnel and allowed to cool to 50–60° C. At this temperature, the dry zinc chloride-butanol solution was added during the course of 10 minutes with constant stirring. Still maintaining the temperature at 50–60° C. the sodium butylate solution was added during one and one-half hours with stirring. After the addition was complete, the reaction mixture was heated to reflux and kept at this temperature with stirring for 20 hours. At the end of this time, 335 cc. of dry butanol were stripped off via the condensate trap, and 212 grams of a mineral lubricating oil were then added. The solution was allowed to cool to 70° C., and 700 cc. of dry toluene were added. The mixture was stirred for one hour and then allowed to stand overnight. The reaction mixture was filtered on a pressure filter, and the filtrate then charged to a distilling flask where the solvent was stripped under vacuum to a temperature of 110° C. at 1 mm. mercury absolute pressure. The weight of product obtained was 447 grams; and this was made into a 25 per cent concentrate by the addition of 533 grams of additional mineral lubricating oil.

The above described magnesium and zinc salts of the alkyl beta-naphthol were tested in the CFR high speed engine test as set forth below in Table X.

*Aldehyde-alkyl phenolate condensation product additives*

The following example is set forth to illustrate the effectiveness of the combination of the magnesium and zinc salts of the aldehyde-alkyl phenolate condensation products for purposes of the present invention. In this case, roughly one mol of formaldehyde was condensed with 2 mols of a C₂₉ alkyl phenol prepared from a butylene polymer, and the magnesium and zinc salts of the resulting condensation product were formed.

The condensation product was prepared as follows: 501 grams (1 mol calculated from hydroxyl number) of the C₂₉ alkyl phenol were mixed with 41.7 grams (0.5 mol) of a 36 per cent formaldehyde solution, 150 grams of xylene, 3 grams of concentrated hydrochloric acid, and 1.5 grams of "Nacconol NR" (a sulfate type of detergent). The mixture was heated at 210° F. under total reflux for 1.5 hours. The water trap was then adjusted for collecting water, and water was collected until the reaction temperature reached 300° F. Heating at this temperature was continued for one-half hour. A total of 35 ml. of water was removed. The reaction mixture was cooled, diluted with ether, washed with water six times, benzene added, and refluxed until dry and the solvent stripped. A yield of 347 grams of the crude condensation product was obtained.

In a second preparation utilizing the same procedure, 1.5 mol of alkyl phenol to 0.83 mol of formaldehyde was employed, and 752 grams of crude condensation product were obtained. The major portions of the foregoing products were combined and stripped under vacuum to remove unreacted alkyl phenol and any olefin remaining in the alkyl phenol. 181 grams were removed overhead at a temperature of 130–204° C. at 100 microns absolute pressure. A yield of residue of 926 grams of the desired condensation product was obtained, which analyzed to a molecular weight (F. P. benzene) of 1040–922, as against a calculated molecular weight of 1014.

The magnesium salt of the C₂₉ alkyl phenol-formaldehyde condensation product was prepared as follows: 500 grams (0.493 mol calculated from theoretical molecular weight) of the alkyl phenol-formaldehyde condensation product in 3000 ml. of toluene were refluxed under a water separator until dry, and a total of 800 ml. of solvent had been removed. The remaining solution was then cooled, and 447 ml. (0.49 mol) of a 1.095 molar anhydrous magnesium methoxide solution in methanol were added. The mixture was heated to reflux and solvent removed under a water trap until the reaction temperature reached 225° F., when it was maintained at this temperature for six hours. 1536 grams of a mineral lubricating oil, calculated to give a 25 per cent concentrate, were then added and the solvent stripped. The resulting magnesium salt of the C₂₉ alkyl phenol-formaldehyde condensation product

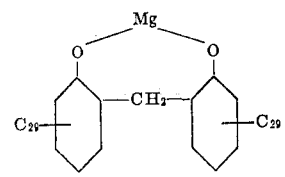

analyzed to a Mg content of 0.56 per cent by weight as against a calculated Mg content of 0.59 per cent, and to an ash content of 1.006 per cent as against a calculated content of 0.98 per cent. No heat treatment was required to maintain this particular magnesium salt concentrate in a fluid state.

The zinc salt of the C₂₉ alkyl phenol-formaldehyde condensation product was prepared as follows: 386 grams of C₂₉ alkyl phenol-formaldehyde condensation product (0.38 mol basis molecular weight of 1011) were dissolved in 200 cc. of dry butanol. An anhydrous sodium butylate solution was prepared by dissolving 9 grams (0.38 mol) of sodium metal in 342 cc. of dry butanol. An anhydrous zinc chloride solution in butanol was prepared by dissolving 28 grams (0.19 mol plus 10 per cent excess) of zinc chloride in 150 cc. of dry butanol, and stripping off 70 cc. of the butanol. The above described zinc chloride-butanol and sodium butylate solutions were added respectively at 50–60° C. to the above described butanol solution of the alkyl phenol-formaldehyde condensation product. The mixture was refluxed 20 hours with stirring, during which time 190 cc. of butanol were stripped off. 110 grams of mineral lubricating oil, calculated to give a 50 per cent concentrate, were then added. 1000 cc. of toluene were added and the product was filtered. The clear filtrate was charged to a distilling flask, and the solvent stripped under vacuum to a temperature of 110° C. at 1 mm. mercury absolute pressure. A yield of the 50 per cent concentrate of the zinc salt of the alkyl phenol-formaldehyde condensation product of 491 grams was obtained.

Samples of the foregoing magnesium and zinc salts of the alkyl naphthol, and of the alkyl phenol-formaldehyde reaction product, were added to an airplane engine base oil of the character set forth above in amounts to get the indicated percentages of active ingredients by weight, as set forth in the following table X. These compounded oils were then compared with the base oil, and also with the base oil containing a well-known motor oil additive, in the above described CFR high speed engine test with the following results:

TABLE X

*CFR high speed engine tests*

| Additives | Piston Skirt Deposit | |
|---|---|---|
| | Percent Covered | Thickness In.×10⁻⁴ |
| None (Base Oil) | 87 | 6.55 |
| 0.5% Zinc dibutyl dithiocarbamate | 69 | 1.11 |
| 0.9% Mg alkyl beta-naphtholate plus 0.45% Zn alkyl beta-naphtholate | 37 | 0.99 |
| 1.25% Mg salt of alkyl phenolformaldehyde condensation product plus 0.66% Zn salt of alkyl phenolformaldehyde condensation product | 14 | 0.34 |
| 0.5% Zinc dibutyl dithiocarbamate | 75 | 2.70 |
| None (Base Oil) | 79 | 3.96 |

In the foregoing table, the magnesium and zinc salts of the alkyl beta-naphthol employed in the test undoubtedly contained a small proportion of unreacted alkyl beta-naphthol. Notwithstanding the presence of this impurity, the test demonstrated effective engine cleanliness properties for this polynuclear type of additive in comparison to the bracketed runs on the base oil alone, and the base oil containing the motor oil type of inhibitor. Here again, the test on the magnesium and zinc salts of the alkyl phenol-formaldehyde condensation product compared favorably with bracketed runs on the preferred magnesium and zinc mono-alkyl phenolates. The combination of the magnesium and zinc salts of any of the foregoing types of compounds which afford satisfactory engine cleanliness, also provide the new result of avoiding any substantial increase in objectionable combustion chamber deposits in high power service with leaded fuel.

While the formula listed above for the magnesium salt of the alkyl phenol-formaldehyde condensation product represents the theoretical monomer prepared from 2 mols of the alkyl phenol to one mol of formaldehyde, it is to be understood that other condensation products utilizing a ratio of 2 mols of the alkyl phenol to 1-3 mols or more of formaldehyde, or other aldehyde, can be used. Thus, the monomer containing the two alkyl phenol nuclei can be interconnected by two or more methylene groups, in addition to the magnesium or zinc metal. Also, in place of the simple monomer, condensation products can be prepared of polymeric character, wherein more than two of the alkyl phenol nuclei are interconnected by methylene or other alkylene groups, and are neutralized to form the corresponding magnesium and zinc salts. Also, it has been found that certain of these condensation products analyzed to a higher hydroxyl number than the theoretical, which may be due to the presence in the condensation product of methylol ($CH_2OH$) groups. All of the foregoing types of monomeric and polymeric condensation products are suitable for purposes of the present invention.

It is thus seen that the invention involves an airplane engine oil, or other crank-case lubricating oil adapted for heavy duty high power service with leaded fuel, containing the combination of the indicated percentages of magnesium and zinc salts of alkyl hydroxy aromatic compounds consisting of carbon, hydrogen and oxygen, and having a hydroxyl group attached to the nucleus, wherein each alkyl hydroxy aromatic compound contains at least one alkyl phenolate nucleus, or other alkyl hydroxy aromatic nucleus, wherein the alkyl substituents attached to the nucleus have a total of at least 15 carbon atoms.

Obviously many modifications and variations of the invention, as hereinbefore set forth, may be made without departing from the spirit and scope thereof and, therefore, only such limitations should be imposed as are indicated in the appended claims.

We claim:

1. An airplane engine oil consisting essentially of a refined mineral lubricating oil having an SUS viscosity at 210° F. in excess of 80, containing the combination of 0.5-2.0% by weight of the magnesium salt and 0.25-1.5% of the zinc salt of a nuclearly alkylated hydroxy aromatic compound consisting of carbon, hydrogen and oxygen and having a hydroxyl group attached to the ring, said compound containing at least one aromatic nucleus having alkyl substituents attached to the nucleus having a total of at least 15 carbon atoms, the conjoint action of said magnesium and zinc salts being such as to maintain engine cleanliness while at the same time preventing any substantial increase of objectionable combustion chamber deposits over that occurring with the lubricating oil alone, whereby preignition and loss of power of the engine are avoided.

2. An airplane engine oil consisting essentially of a refined mineral lubricating oil having an SUS viscosity at 210° F. in excess of 80, about 0.5-2.0% by weight based on the lubricating oil of a magnesium alkyl phenolate wherein the alkyl substituents on each benzene nucleus of the said phenolate compound contain a total of at least 18 carbon atoms, and about 0.25-1.5% by weight based on the lubricating oil of a zinc alkyl phenolate wherein the alkyl substituents on each benzene nucleus of the said phenolate compound contain a total of at least 18 carbon atoms, the conjoint action of said magnesium and zinc compounds being such as to maintain engine cleanliness while at the same time preventing any substantial increase of objectionable combustion chamber deposits over that occurring with the lubricating oil alone, whereby preignition and loss of power of the engine are avoided.

3. An airplane engine oil according to claim 2, wherein both the magnesium and zinc compounds are formed from the alkylation reaction product of a phenol with a propylene polymer providing alkyl substitution on the benzene nucleus containing a total of from 18 to 60 carbon atoms.

4. An airplane engine oil according to claim 2, wherein both the magnesium and zinc compounds are formed from the alkylation reaction product of phenol with a selected fraction of propylene polymer having an average of 18 to 30 carbon atoms to the molecule.

5. An airplane engine oil according to claim 2, wherein the mineral lubricating oil is a highly refined residuum from a paraffin base crude.

6. An airplane engine oil consisting essentially of a highly refined mineral lubricating oil having an SUS viscosity at 210° F. in excess of 80, about 0.5–1.5% by weight on the basis of the lubricating oil of magnesium alkyl phenolate wherein the alkyl group substituted on each benzene nucleus contains from 15 to 30 carbon atoms, and 0.25–1.0% of zinc alkyl phenolate wherein the alkyl group substituted on each benzene nucleus contains from 15 to 30 carbon atoms, the conjoint action of the said magnesium and zinc alkyl phenolates being such as to substantially prevent ring sticking as well as minimizing carbon and lacquer deposition on the piston skirt and ring belt area while at the same time avoiding any substantial increase of combustion chamber deposits over that occurring with the lubricating oil alone, whereby preignition and loss of power of the engine are avoided.

7. An airplane engine oil according to claim 6, wherein the magnesium alkyl phenolate is in a proportion of about 1% by weight, and the zinc alkyl phenolate is in a proportion of about 0.5% by weight.

8. An airplane engine oil according to claim 6, wherein the said mineral lubricating oil is a solvent deasphalted, solvent refined, solvent dewaxed, clay contacted and clay filtered residuum from a paraffin base crude having an SUS viscosity at 210° F. of about 80–130.

9. An airplane engine oil consisting essentially of a refined mineral lubricating oil having an SUS viscosity at 210° F. in excess of 80, about 0.5–2.0% by weight based on the lubricating oil of a magnesium alkyl phenolate wherein the alkyl substituents on each benzene nucleus of the said phenolate compound contain a total of at least 20 carbon atoms, and about 0.25–1.5% by weight based on the lubricating oil of a zinc alkyl phenolate wherein the alkyl substituents on each benzene nucleus of the said phenolate compound contain a total of at least 10 carbon atoms, the conjoint action of said magnesium and zinc compounds being such as to maintain engine cleanliness while at the same time preventing any substantial increase of objectionable combustion chamber deposits over that occurring with the lubricating oil alone, whereby preignition and loss of power of the engine are avoided.

10. A compounded mineral lubricating oil adapted for crank-case lubrication of an internal combustion engine under heavy duty conditions including high power output, which comprises a mineral lubricating oil as the predominant constituent, about 0.5–2.0% by weight based on the lubricating oil of a magnesium salt and about 0.25–1.5% by weight based on the lubricating oil of a zinc salt, each salt being the salt of a nuclearly alkylated hydroxy aromatic compound consisting of carbon, hydrogen and oxygen and having a hydroxyl group attached to the ring, said compound containing at least one aromatic nucleus having alkyl substituents attached to the nucleus having a total of at least 15 carbon atoms, the conjoint action of said magnesium and zinc salts being such as to maintain engine cleanliness while at the same time preventing any substantial increase of objectionable engine deposits with leaded fuel over that occurring with the lubricating oil alone, whereby preignition and loss of power of the engine are avoided.

11. A composition according to claim 10 wherein the lubricating oil is an airplane engine oil consisting essentially of a refined oil having an SUS viscosity at 210° F. in excess of 80.

12. A lubricating composition comprising a mineral lubricating oil as the predominant constituent, about 0.5 to 2.0 per cent by weight based on the lubricating oil of a magnesium alkyl phenolate wherein the alkyl substituents on each benzene nucleus of the said phenolate compound contain a total of at least 18 carbon atoms, and about 0.25 to 1.5 per cent by weight based on the lubricating oil of a zinc alkyl phenolate wherein the alkyl substituents on each benzene nucleus of the said phenolate compound contain a total of at least 18 carbon atoms.

13. A lubricating composition according to claim 12 wherein both the magnesium and zinc compounds are formed from the alkylation reaction product of a phenol with a propylene polymer providing alkyl substitution on the benzene nucleus containing a total of from 18 to 30 carbon atoms.

14. A lubricating composition which comprises a mineral lubricating oil as the predominant constituent, about 0.5 to 1.5 per cent by weight on the basis of the lubricating oil of magnesium alkyl phenolate wherein the alkyl group substituted on each benzene nucleus contains from 15 to 30 carbon atoms, and 0.25 to 1.0 per cent of zinc alkyl phenolate wherein the alkyl group substituted on each benzene nucleus contains from 15 to 30 carbon atoms, the conjoint action of the said magnesium and zinc alkyl phenolates being such as to substantially prevent ring sticking as well as minimizing carbon and lacquer deposition on the piston skirt and ring belt area while at the same time avoiding any substantial increase of combustion chamber deposits over that occurring with the lubricating oil alone, whereby preignition and loss of power of the engine are avoided.

15. A lubricating composition according to claim 14 wherein the said mineral lubricating oil is a solvent deasphalted, solvent refined, solvent dewaxed, clay contacted and clay filtered residuum from a paraffin base crude having an SUS viscosity at 210° F. of about 80 to 130.

References Cited in the file of this patent

UNITED STATES PATENTS

| Number | Name | Date |
| --- | --- | --- |
| 2,289,795 | McNab | July 14, 1942 |
| 2,420,893 | McNab | May 20, 1947 |